United States Patent [19]
Jones

[11] 3,722,332
[45] Mar. 27, 1973

[54] APPARATUS FOR SECURING THE BOLTS OF THE REACTOR PRESSURE VESSEL HEAD TO THE REACTOR PRESSURE VESSEL

[75] Inventor: Cecil R. Jones, San Jose, Calif.

[73] Assignee: Transfer Systems Incorporated, New York, N.Y.

[22] Filed: June 1, 1971

[21] Appl. No.: 148,617

[52] U.S. Cl. .............................. 81/57.38, 254/29 A
[51] Int. Cl. ............................................ B25b 29/02
[58] Field of Search....81/57.38, 57.36, 57.22, 57.25, 81/57.24; 254/29 A

[56] References Cited

UNITED STATES PATENTS

| | | | |
|---|---|---|---|
| 3,015,975 | 1/1962 | Biach | 81/57.38 |
| 3,008,362 | 11/1961 | Tucker | 81/57.38 |
| 2,866,370 | 12/1958 | Biach | 81/57.38 |
| 3,287,999 | 11/1966 | Kreokel et al. | 81/57.36 |

Primary Examiner—James L. Jones, Jr.
Attorney—Jack Oisher

[57] ABSTRACT

Apparatus securing a locking bolt of a pressure head to a reactor pressure vessel in which the pressure head flange is urged in one direction and the bolt is tensioned in an opposite direction to reduce the interfacing force between confronting walls of a nut securing the locking bolt and the pressure head flange, while an operator tightens the nut against the pressure head flange. For tensioning the bolt, a cylindrical force transmitting member has its lower end threaded for engagement with the locking bolt and it upper end threaded, but without any pitch, to receive in threaded engagement a puller or lifter rod similarly threaded. The force transmitting member is split axially so that its halves can be displaced radially to facilitate the retaining of the lifter rod in threaded engagement therewith, while rotating the force transmitting member for adjustable threaded engagement with the locking bolt without rotating the puller rod. Axially movable retaining sleeves surround the split force transmitting member for at times to permit separation thereof to retain the lifted rod in threaded engagement therewith while rotating the force transmitting member for adjustable threaded engagement with the locking bolt without rotating the puller rod, and at other times securing the force transmitting member in locking engagement with the lifter rod for movement therewith. For urging the flange in the one direction a force is transmitted through columns and a connector sleeve for application to the pressure head flange. A suitable hydraulic system with pistons initiates the transmitted forces in each direction.

15 Claims, 7 Drawing Figures

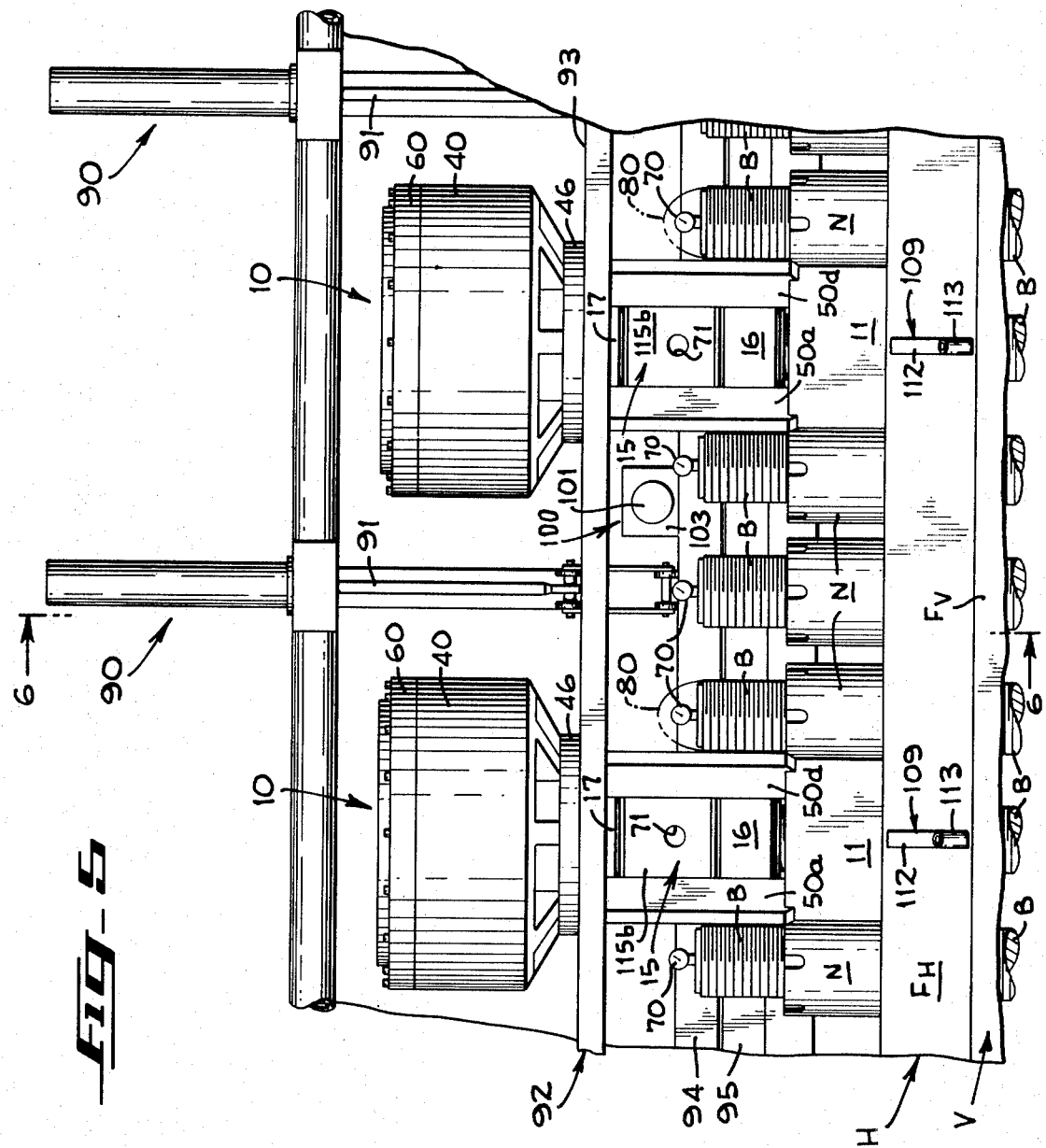

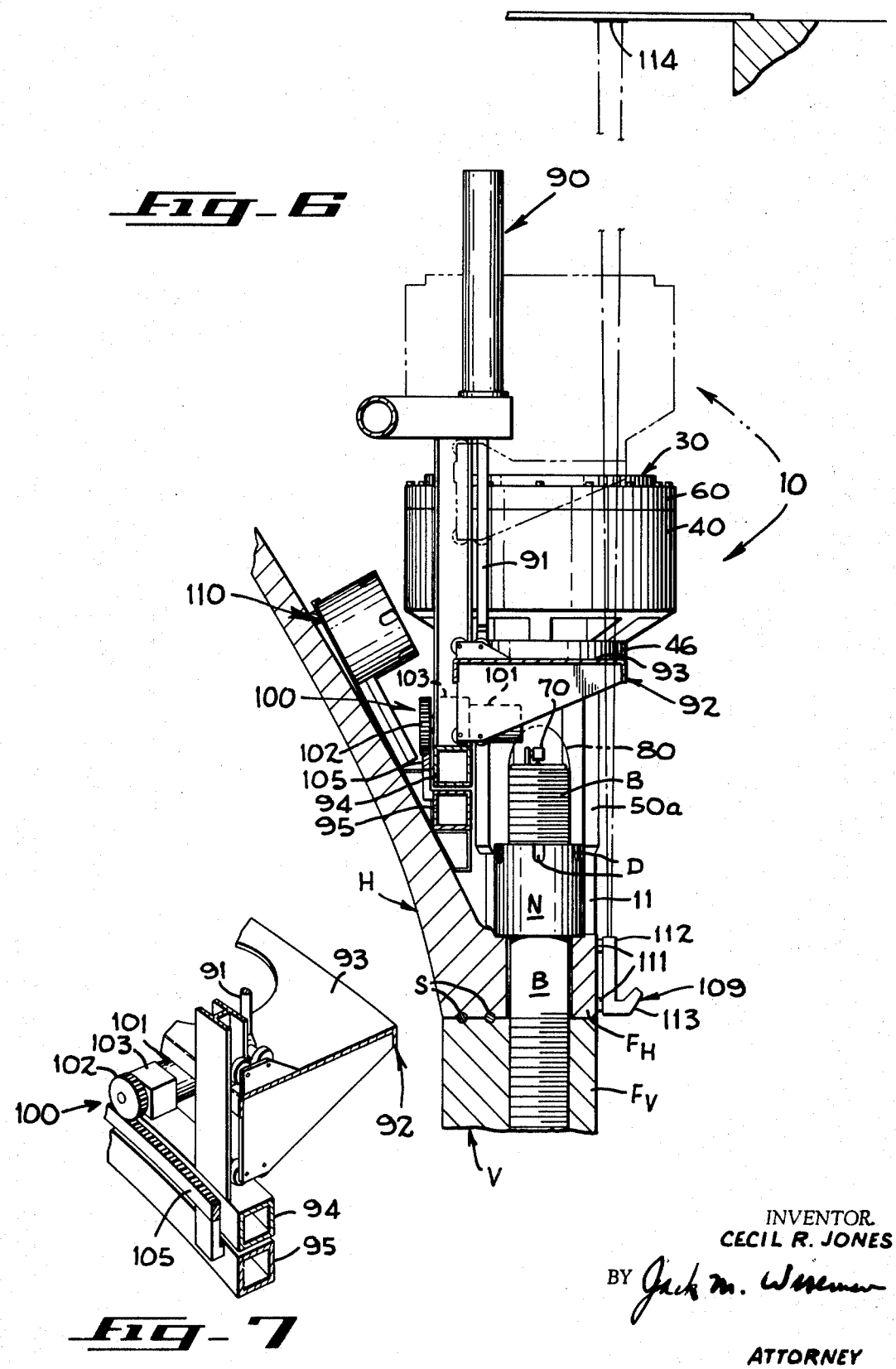

APPARATUS FOR SECURING THE BOLTS OF THE REACTOR PRESSURE VESSEL HEAD TO THE REACTOR PRESSURE VESSEL

BACKGROUND OF THE INVENTION

The present invention relates to bolt securing apparatus, and more particularly to apparatus for securing bolts of a pressure head to a reactor pressure vessel.

A reactor pressure vessel for a boiling water nuclear power station contains the fuel which is the source of power. A pressure vessel head closes the reactor pressure vessel and is conventionally bolted to the flange of the reactor pressure vessel. Approximately on an annual basis, the fuel is replaced. At each refueling, the reactor is shut down and the pressure head is removed from the reactor pressure vessel to permit all the equipment above the reactor core to be removed for gaining access to the reactor fuel for replacement. After the spent fuel is replaced with new fuel, the equipment is replaced in the pressure vessel and the pressure head is again bolted to the flange of the reactor pressure vessel.

In boiling water reactors and in pressure water reactors, the reactor pressure head must withstand an internal pressure in the range of 1,000 p.s.i. – 2,000 p.s.i. Therefore, the bolts and the nuts are pre-tensioned to withstand a pressure of a prescribed magnitude, which is great enough to resist the internal pressure in the pressure head and to provide an effective seal between the reactor pressure vessel and the pressure head.

Heretofore, the conventional bolt tensioning apparatus required as long as 70 hours or more for head removal time. Also, such systems increased the probability of unequal tension among the various bolts.

Patents of interest are:
Patent No. 2,866,370
Patent No. 3,015,975
Patent No. 3,158,052
Patent No. 3,162,071

SUMMARY OF THE INVENTION

Bolt securing apparatus with a force transmitting member detachably secured at one end in threaded engagement with a securing bolt and at another end releasably secured to a puller rod. The force transmitting member is split axially into two segments for radial displacement to facilitate the retaining of the puller rod in engagement therewith, while rotating the force transmitting member for adjustable threaded engagement with the locking bolt without rotating the puller rod. A restraining sleeve surrounds the split force transmitting member and is movable axially for at times permitting radial separation of the cylindrical force transmitting member and at other times for securing the cylindrical force transmitting member in locked threaded engagement with the puller rod for movement therewith.

The threads of the force transmitting member engaging the puller rod are formed without a pitch. Likewise, the threads of the puller rod confronting the force transmitting member are formed without a pitch. This feature enables the force transmitting member at times to retain the puller rod in threaded engagement therewith while the force transmitting member is rotated in adjustable threaded engagement with the locking bolt without rotating the puller rod and at other times to be secured in locking threaded engagement with the puller rod for movement therewith.

By virtue of this arrangement, bolt securing time for the removal and replacement of a pressure head and a reactor pressure vessel can be reduced considerably. Further, the securing and releasing between the force transmitting member and its associated puller rod and locking bolt can be facilitated considerably and also is more rapid. Operation impediments caused by misalignment can now be reduced.

Still another feature of the present invention is the simultaneous securing of selected bolts by a plurality of bolt securing apparatus so that the entire securing process can be completed more rapidly.

A still another feature of the present invention is an apparatus positioning device that positions each securing apparatus over its associated bolt and when the bolt securing process is completed, the device lifts the securing apparatus and advances them for positioning to the succeeding bolt and lowers the securing apparatus for the succeeding securing sequence.

A still another feature is the apparatus positioning device including storage facilities for bolts securing parts and apparatus.

Another feature of the present invention is that each bolt has an extensometer mounted thereon with a dial indicator, which is read individually for ascertaining the bolt elongation for each bolt respectively, which extensometer remains with the bolt during the entire tensioning process, thus improving the accuracy of bolt tensioning.

Another feature of the present invention is an optical device for checking the uniformity of the tension of all bolts for improved safety of operation of the nuclear reactor power plant.

DESCRIPTION OF THE DRAWINGS

FIG. 3 is a horizontal sectional view taken along line 3—3 of FIG. 1 of the apparatus shown in FIG. 1.

FIG. 4 is a plan view of the apparatus shown in FIG. 1.

FIG. 5 is a fragmentary developed front elevation view of the apparatus positioning device embodying the present invention illustrated in conjunction with a plurality of the bolt securing apparatus.

FIG. 6 is a sectional view of the apparatus positioning device and bolt securing apparatus illustrated in FIG. 5 taken along line 6—6 of FIG. 5 and shown with an optical device for checking the uniformity of the tension of the bolts.

FIG. 7 is a fragmentary perspective view of a gear arrangement for rotating the bolt securing apparatus of the present invention.

DESCRIPTION OF THE PREFERRED EMBODIMENT

Figure 1:
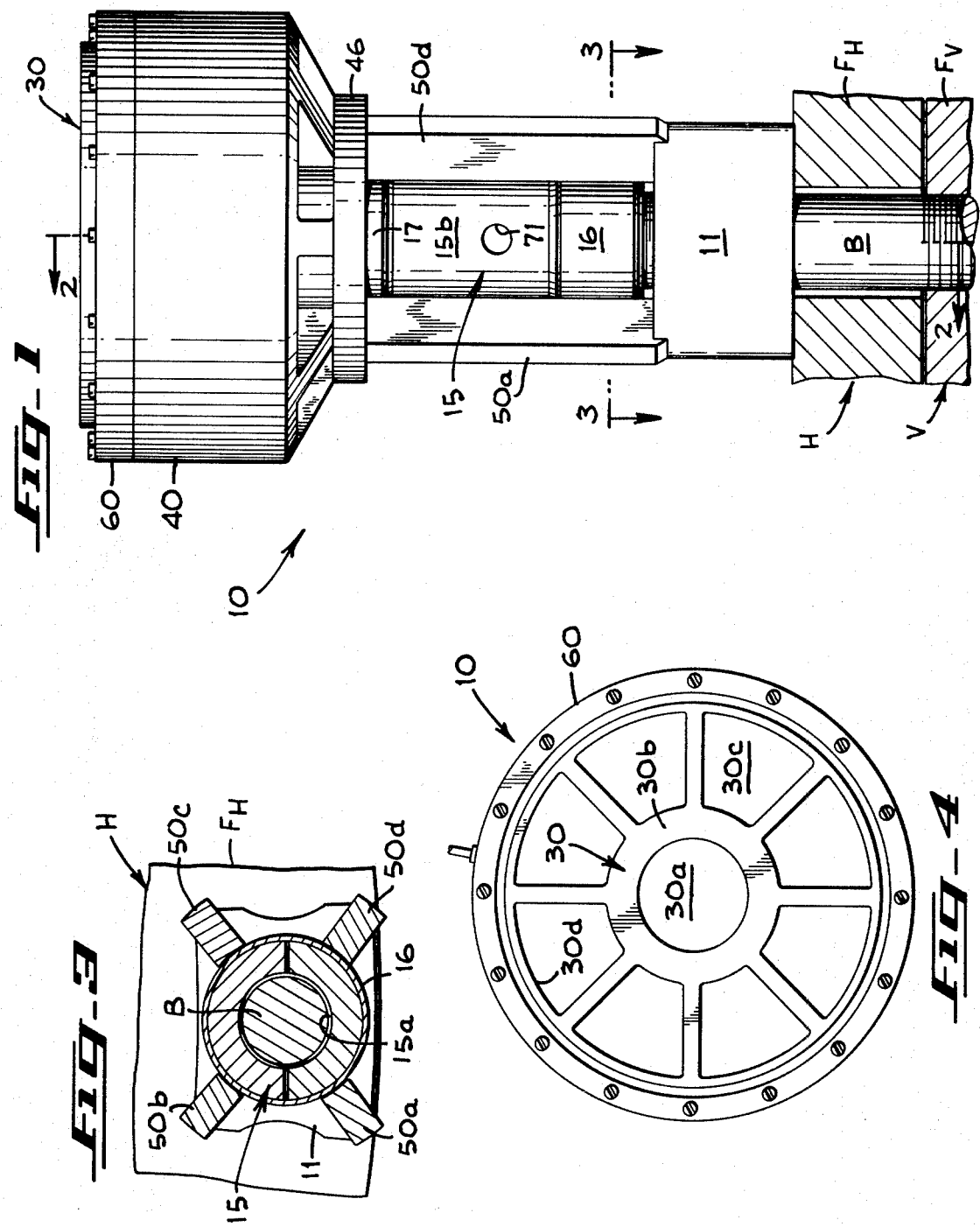
FIG. 1 is a front elevation view of apparatus embodying the present invention illustrated in conjunction with a nut and bolt for securing a pressure head to a reactor pressure vessel.
Figure 2:
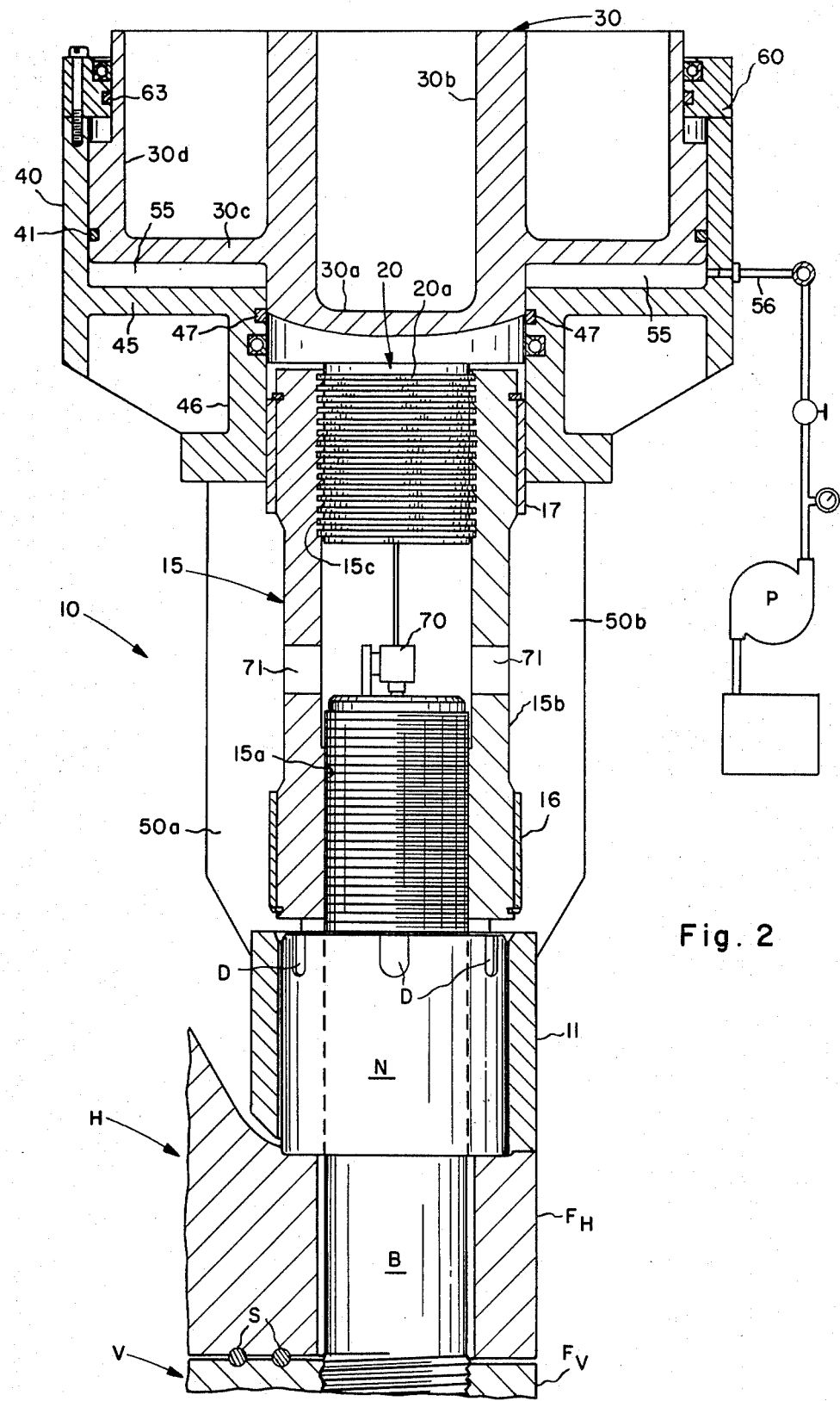
FIG. 2 is an enlarged axial sectional view, partly in elevation, of the apparatus shown in FIG. 1 taken along line 2—2 of FIG. 1.

Illustrated in FIGS. 1 and 2 is a flange $F_V$ of a reactor pressure vessel V in which vessel is stored nuclear fuel. A pressure head flange $F_H$ of a pressure head H is bolted to the flange $F_V$ of the reactor pressure vessel V by bolts B. Nuts N in threaded engagement with the threads of the bolts B urge the confronting walls of the pressure head flange $F_H$ of head H and the flange $F_V$ of vessel V in sealing and locking engagement. The head of the bolt B, not shown, engages the lower wall of the flange $F_V$ of the vessel v. Suitable metallic O-rings S are interposed between the flange $F_H$ and the flange $F_V$ for sealing engagement.

The apparatus 10 of the present invention serves to urge confronting walls of the nut N and the flange $F_H$ of the head H away from one another so that an operator can tighten the nut N into engagement with the flange $F_H$ of the head H. Through this action, the bolt B can be tightened to a prescribed tension, whereby a group of tightened bolts B not only meet a predetermined locking tension for each bolt B but also the locking tension for all the bolts B are uniform.

As shown in FIGS. 1–3, the apparatus 10 comprises a cylindrical sleeve 11 in which is disposed the nut N. The lower wall of the sleeve 11 confronts the upper wall of the flange $F_H$ of the head H surrounding the bolt B. The threaded portion of the bolt B extends above the sleeve 11 into a cylindrical force transmitting body 15. According to the present invention, the force transmitting body 15 is split axially to form two semi-cylindrical sections. In this manner, the force transmitting body 15 through its semi-cylindrical sections is capable of radial displacement.

At its lower portion, the force transmitting body 15 is suitably internally threaded at 15a to engage in threaded engagement the upper threaded portion of the bolt B. A lower retainer ring 16 and an upper retainer ring 17 urge the semi-cylindrical sections of the body 15 toward one another. When the retainer rings 16 and 17 are in the position shown in FIGS. 1 and 2, the semi-cylindrical sections of the body 15 are retained in a close fitting relationship. When the retainer rings 16 and 17 are moved axially into the reduced outside diameter portion 15b of the body 15, the semi-cylindrical sections of the body 15 are capable of radial displacement relative to one another.

At the upper portion of the cylindrical body 15 are internal threads 15C which are square threads and do not have any pitch. Received by the upper portion of the body 15 in threaded engagement with the threads 15C is a puller rod 20, which is also formed with square threads 20a that do not have any pitch. The square threads 20a of the puller rod are in threaded engagement with the square threads 15C of the body 15.

By virtue of the above arrangement, the force transmitting body 15 and the retainer rings 16 and 17, when the retainer rings are positioned at the reduced diameter portion 15b of the force transmitting body 15, can be rotated in unison about the axis of the force transmitting body for threaded adjustment with the locking bolt B while retaining the puller rod 20 in threaded engagement therewith without rotating the puller rod 20. When the retainer rings 16 and 17 are in the position shown in FIGS. 1 and 2, the force transmitting body 15 is secured to the puller rod in locking engagement therewith for movement therewith and for transmitting a bolt tensioning force between the puller rod 20 and the bolt B. Through this arrangement, a rapid adjustable connection and a rapid disconnection between the force transmitting body 15 and the locking bolt B is achieved without removing the puller rod 20 from the force transmitting body 15. Delay due to misalignment of parts has, therefore, been reduced.

Integrally formed with the upper end of the puller rod 20 is a piston 30. The piston 30 comprises a disc shaped base 30a, which is integral with the upper wall of the puller rod 20. A cylindrical wall 30b of the piston 30 projects upwardly from the disc base 30a. An annular flange 30c of the piston 30 projects radially from the cylindrical wall 30b. A cylindrical wall 30d of the piston 30 projects from the outer end of the flange 30c in the axial direction.

In sealing engagement with the piston 30 is a cylinder member 40. A suitable O-ring seal 41 is in sealing engagement between the cylindrical wall 30d of the piston 30 and the cylinder member 40 acting as a cylinder. Integrally formed with the inner wall of the cylinder member 40 and projecting radially inward therefrom is an annular flange 45. Projecting downwardly from the flange 45 and integrally formed therewith is a cylindrical wall 46. A suitable O-ring seal 47 is disposed in sealing engagement with the disc base 30a of the piston 30 and the wall 46.

Depending from the cylindrical wall 46 and integrally formed therewith are axially extending, radially spaced columns 50a–50d which are integrally formed at the feet thereof with the cylindrical sleeve 11. The columns 50a–50d are suitably concaved at the walls thereof confronting the force transmitter body 15, but are spaced therefrom. Thus, an operator may insert a wrench therebetween for inserting into the detents D for rotating the nut N.

The annular wall 30c of the piston 30 and the annular flange 45 are sufficiently spaced apart to define a chamber 55 of an annular configuration. Fluid under pressure from a suitable source of supply of hydraulic fluid is introduced into the chamber 55 through a flexible conduit 56. The fluid under pressure in the chamber 55 serves to raise the piston 30 by applying a force against the cylindrical wall 30c and serves to lower the flange 45 by applying a force against the flange 45.

The raising of the piston 30 elevates the pull rod 20. This action, in turn, transmits a force to the force transmitting body 15 for raising the force transmitting body 15 and, in turn, tensioning the bolt B in a direction away from the flange $F_H$ of the vessel head H. At the same time, the flange 45 is lowered in the manner above described. This action causes the columns 50a–50 to move downwardly with the flange 45 and transmit a downwardly directed force through the connector sleeve 11. The connector sleeve 11, in turn, urges the flange $F_H$ of the head H downwardly away from the nut N. An operator can easily turn the nut N through a suitable tool for tightening the same against the flange $F_H$ of the vessel head H by inserting a wrench in the accesses between the columns 50a–50d. The wrench is received by the nut detents D for rotating the nut N. The apparatus 10 as illustrated in FIG. 2 is in the bolt tensioned position for rotating the nut N.

When the supply of hydraulic fluid under pressure in the chamber 55 is interrupted or discontinued through a suitable shutoff valve, the connector sleeve 11 returns the flange 45 to its initial position. The piston 30 also returns towards its unloaded position through the interruption of the fluid under pressure into the chamber 55. At this time, the sleeves 16 and 17 are moved axially to the reduced diameter portion 15b of the force transmitting body. The semi-cylindrical sections of the force transmitting body 15 are then moved radially outward to disconnect the body 15 from the locking bolt B. The puller rod 20 remains in threaded engagement with the body 15. Thus, the bolt B is now disconnected from the apparatus 10 so that the apparatus 10 can be moved angularly for the succeeding bolt securing operation. An annular stop member 60 with O-ring seal 63 is bolted to member 40.

A conventional extensometer 70 is fixed to the bolt B for measuring the bolt elongation and may be of the type disclosed in U.S. Pat. No. 3,015,975. Formed in the force transmitting body 15 is an opening 71 aligned with the extensometer 70 to enable an operator to read the dial indicator of the extensometer 70. The extensometer 70 is attached respectively to each bolt B and remains attached to each bolt B respectively during the entire bolt tensioning operation for improved accuracy. Through this arrangement, the tension on each bolt B is read individually and can be read individually for each bolt B during the entire bolt tensioning operation for the flanges $F_H$ and $F_V$ to be certain of uniformity of tension among all the bolts B and that each bolt B meets its prescribed minimum requirements for the safety of the nuclear power plant.

According to the present invention, the flange $F_H$ of the pressure head H is secured to the flange $F_V$ of the vessel V by securing a preselected number of bolts B and associated nuts N simultaneously. In the exemplary embodiment, a plurality of bolt securing apparatus 10 (FIGS. 5 and 6) are employed simultaneously, which serve to tension, for example, every fourth locking bolt B in the manner above described and to unseat the associated nut N from the flange $F_H$ in the manner above described. Thus, it takes four sequential operations, in the exemplary embodiment, to bolt the flange $F_H$ to the flange $f_V$. During each cycle, one-fourth of the bolts B are secured. The apparatus 10 are angularly spaced in equal distances from one another about the axis of the head H and the vessel V and move in a circular path about the axis of the head H and the vessel V to advance to successive bolts during each succeeding bolt securing cycle or sequence. Each apparatus 10 is angularly spaced from its adjacent apparatus 10 by an angular distance equal to the angular distance between five successive bolts. Thus, each apparatus 10 advances to four successive bolts B during the four sequential bolt securing operations.

For facilitating the placement of the pressure head flange $F_H$ on the vessel flange $F_V$, a preselected number of bolts B have a removable conical cap 80 seated thereon for guiding and indexing the location of the apparatus 10 with respect to the location of the locking bolts B. In the preferred embodiment, a conical cap 80 is seated on every fourth locking bolt B. The caps 80 are received by openings in a rotatable annular plate 94 that is fixed to all of the cylindrical walls 46 of the apparatus 10 through a platform 92. After the initial positioning of the apparatus 10 on the flange $F_h$, the conical caps 80 are removed. During each bolt securing cycle or sequence, each extensometer 70 will remain with its associated bolt B during the entire bolt tensioning operation. After all the bolts are secured, the extensometers 70 will be detached. In this manner, there is assurance that each bolt B will be properly tensioned and all the bolts B are of equal tension.

In order to advance each bolt securing apparatus 10 to the succeeding bolt over a circular path, each apparatus 10 is elevated at the completion of each cycle and lowered at the beginning of each successive cycle. Toward this end, a suitable hydraulic system 90 is provided with each apparatus 10. Depending from each hydraulic system 90 is a shaft 91. The shaft 91 is elevated or raised in a well-known manner by the associated hydraulic system 90.

At the distal end of each shaft 91 is fixed an elevator platform 92 and a horizontal plate 93, which is fixed to the cylindrical wall 46 of each of the apparatus 10. Thus, the raising of the pistons, not shown, in the hydraulic systems 90 raises the shafts 91. In turn, the shafts 91 raise the elevator platform 92 and the horizontal plate 93. When the elevator platform 92 and the horizontal plate 93 are fully raised, each apparatus 10 is elevated to the position shown in dotted lines in FIG. 6. When the elevator platform 92 and the annular plate 93 are fully lowered, each apparatus 10 is lowered to the position shown in solid lines in FIG. 6.

While each of the apparatus 10 is in the fully elevated position, all the apparatus 10 are rotated over a circular path to the succeeding bolt B at the beginning of each bolt securing cycle or sequence. For this purpose, the horizontal plate 93 is fixed to the cylindrical walls 46 of the apparatus 10. To rotate the apparatus 10 to successive angular positions, each apparatus 10 has a suitable drive arrangement 100 which includes an electrically operated drive motor 101, a pinion gear 102, a gear reducer 103, and rack 105. The apparatus 10 and drive 100 are fixed to a movable annular plate 94. The gear rack 105 is fixed to a stationary annular plate 95. The plate 95 is fixed to the pressure head H. Suitable bearings, not shown, are interposed between the annular plate 94 and the stationary plate 95 so that the annular plate 94 moves relative to the plate 95 for rotating the apparatus 10 over a circular path. An operator energizes the electrical motor 101 mounted on the plate 94 by operating a switch which meshes with the stationary rack 105, thereby rotating the plate 94 with the apparatus 10.

A cylindrical container 110 is mounted on the pressure head H adjacent each apparatus 10 for storing locking bolts, nuts, washers, and the like. By virtue of rotating each apparatus 10 to the succeeding bolt to be secured by means of the drive arrangement 100, the need for an overhead crane for sequential positioning of the apparatus 10 has been obviated.

For the safety of the nuclear power plant, it is essential that all the bolts B be uniformly tensioned. Toward this end, an optical system 109 is magnetically attached to the pressure head by means of an annular magnetic attaching device 111. An optical aligning device 112 with a transit 113 sights a prearranged marker on an overhead scale 114 attached to the edge of the reactor well. If all the bolts B are uniformly tensioned, then the flange $F_H$ of the pressure head H will be substantially flat and the optical aligning device 112 will have its transit 113 sighted for alignment with the prearranged marker. Should the bolts B not be uniformly tensioned, then the flange $F_H$ of the pressure head H will have a slight deviation relative to a horizontal plane. This will result in the transit 113 being sighted slightly off the prearranged marker. Further, bolt tensioning adjustment will be made for uniformity in each discrete bolt B. Thus, initial uniform test is made with the extensometers 70 and the final uniformity test is made with the optical system 109. It is apparent that perfect uniformity in the bolt tensioning will provide the ideal sealing with the o-rings S and between the flange $F_H$ and the flange $F_V$.

I claim:

1. Apparatus for tensioning a bolt and unseating a nut in threaded engagement with the bolt comprising:
   a sleeve adapted to apply a force against a wall on which the nut is seated and adapted for receiving the nut;
   a cylindrical force transmitting body having one end thereof in threaded engagement with a portion of the bolt projecting beyond the nut, said body being separated in the axial direction for radial displacement;
   a puller rod attached to the other end of said cylindrical force transmitting body, and
   hydraulic means connected to said puller rod for applying a force in one axial direction for tensioning the bolt and connected to said sleeve for applying an axial force against the wall on which the nut is seated in an opposite direction.

2. Apparatus as claimed in claim 1 wherein said cylindrical force transmitting body and said puller rod are in threaded engagement by means of pitchless threads.

3. Apparatus as claimed in claim 1 wherein said cylindrical force transmitting body and said puller rod are in threaded engagement by means of square threads.

4. Apparatus as claimed in claim 2 wherein said cylindrical force transmitting body is separated in the axial direction to form semi-cylindrical sections.

5. Apparatus as claimed in claim 4 and comprising a retainer ring surrounding said cylindrical force transmitting body for holding together said cylindrical force transmitting body.

6. Apparatus as claimed in claim 5 wherein said cylindrical force transmitting body has a reduced outer diameter along a portion thereof and said retainer ring is slidable to the reduced diameter portion of the force transmitting body to enable radial displacement thereof and is slidable to the increased diameter portion of the force transmitting body for urging together the cylindrical force transmitting body.

7. Apparatus as claimed in claim 5 wherein said hydraulic means include columns axially disposed and radially spaced that extend along the outer wall of the cylindrical force transmitting body and are connected at the feet thereof to said sleeve for transmitting a force through said sleeve for application against a wall on which the nut is seated.

8. Arrangement for securing confronting flanges of annular configurations through bolts and nuts comprising:
   a plurality of apparatus for tensioning bolts, respectively, and unseating, respectively, nuts in threaded engagement with respective bolts, said apparatus being disposed at equal angular distances about the axis of said confronting flanges;
   elevating means engaging said apparatus for raising and lowering said apparatus, and
   drive means connected to said apparatus for rotating said apparatus about said axis for advancing said apparatus in a circular path.

9. Arrangement as claimed in claim 8 wherein a preselected number of bolts and nuts in threaded engagement are disposed between successive apparatus, said apparatus simultaneously tension associated bolts and simultaneously unseat associated nuts, said drive means advance in sequence said apparatus simultaneously to successive bolts and nut in threaded engagement.

10. Arrangement as claimed in claim 8 and comprising a extensometer mounted on each bolt being tensioned during the entire period of time such bolts are being tensioned for checking for prescribed tension on each bolt, respectively, and for uniform tension between all of the bolts.

11. Arrangement as claimed in claim 8 and comprising detachable guide means mounted on each of preselected bolts for guiding the location of the respective apparatus relative to the location of the associated bolts.

12. Arrangement as claimed in claim 9 wherein said elevating means raises said apparatus at the completion of each bolt securing sequence and said drive means rotate said apparatus while in the raised position prior to the beginning of the succeeding bolt securing sequence.

13. Arrangement as claimed in claim 8 and comprising container means adjacent said apparatus for storing removed bolts and nuts.

14. Arrangement as claimed in claim 9 and comprising optical sighting means mounted on said confronting flanges for sighting a preselected marker to test for uniformity of tension of said bolts.

15. Arrangement as claimed in claim 14 wherein said confronting flanges deviate from a horizontal plane when the tensioning of said bolts is not uniform to misalign said optical sighting means from said marker and wherein said confronting flanges is flat when the tensioning of said bolts is uniform to align said optical sighting means with said marker.

* * * * *